Patented Dec. 19, 1950

2,534,915

UNITED STATES PATENT OFFICE 2,534,915

METHOD OF MAKING POROUS CONCRETE

Benjamin M. King, Jr., Evansville, Ind., assignor to Henry B. Walker, Jr., Evansville, Ind.

No Drawing. Application October 19, 1948, Serial No. 55,429

4 Claims. (Cl. 106—87)

The present invention relates to a cellular non-porous cement product and a method for preparing the same.

More particularly, the invention relates to a method for accurately and consistently preparing cellular non-porous cement blocks of low density, and having good heat insulating properties.

Cement blocks prepared by previously known methods have not found wide acceptance throughout the building trade for various reasons. Primarily, the porous nature of these blocks causes the blocks to absorb a considerable amount of moisture, which is transmitted into the interior of the building, causing the interior to have a lingering damp atmosphere. A further objection to the use of normal cement blocks as construction material resides in the fact that it has been difficult, if not impossible, to secure blocks of uniform quality by the methods of manufacture heretofore used. Heretofore known cellular cement blocks were also deficient because of the varying size of their voids and their lack of capacity to trap large volumes of air.

It is then an object of the present invention to provide a light-weight cementitious building material having separated cells of controlled size to increase the heat insulating capacity of the material.

Another object of the present invention is to provide a process for the manufacture of cement blocks which insures a high degree of uniformity in the finished product.

Another object of the invention is to provide a method for manufacturing cement blocks characterized by their ability to resist impregnation to any substantial degree of water and vapor.

A further object is to produce a non-porous cellular cement block.

In general, the invention comprises forming a mixture of a cement, such as Portland cement, with water and an alkali such as sodium hydroxide or potassium hydroxide and adding to the mixture thus formed an aqueous dispersion containing fine particles of a metal above hydrogen in the electromotive series, such as aluminum, calcium, magnesium, zinc, barium and the like. I have found that by incorporating the metallic particles in the form of a dispersion the characteristics of the products can be varied to suit the intended use of the cement blocks. By using the aforementioned dispersion and by varying the size of the metallic particles, I have found that I can produce a cellular cement structure having independent, non-connecting voids caused by the evolution of gas by the reaction between the metallic powder and the alkali.

The emulsifying agents to be used in accordance with the present invention should have good surface active properties. In this connection, it should be noted that ordinary soap does not function to produce the sulphated and desirable results intended by this invention. I prefer to use emulsifying agents such as the sulphated organic compounds. Examples of these emulsifying agents are the sulphonated higher fatty alcohols such as Gardinol, sulphonated esters of dicarboxylic acids such as Aerosol-MA, alkyl aromatic sulphonates such as Nacconol FSNO, and sulphonated oils such as "Sterox," the trade name of a wetting agent marketed by the Dow Chemical Company.

The size of the aluminum powder determines the size of the void produced in the cement composition. For example, when using an 80 mesh aluminum powder, the average size of the voids was found to be about $\frac{1}{16}$ of an inch in diameter. When using a 280 mesh powder, voids having a diameter of $\frac{1}{8}$ of an inch were produced. When using an 800 mesh aluminum powder, the diameter of the voids was approximately $\frac{1}{16}$ to $\frac{1}{32}$ of an inch. The powder size can range from a mesh size below 80 to above 1000. The cement block compositions with the smallest voids have thin cell walls and are especially useful as insulating materials, while the blocks containing the larger voids have thicker cell walls and are especially useful as building members due to their ability to withstand loads.

The amount of the metallic particles determines the swelling or rising characteristics of the cementitious mixture.

As to the proportions to be used, I prefer to use 94 parts by weight of Portland cement, together with from about 40 to 90 parts by weight of water (5 to 10 gallons) and 0.3 to 0.6 part by weight of sodium or potassium hydroxide in the original mixture. The dispersion of metallic aluminum is prepared by mixing approximately one teaspoonful of a 10% solution of the organic sulphonate "Sterox" with one to three ounces of aluminum powder (equivalent to about 0.06 to 0.19 part by weight). Enough water is added to this mixture to form a stable dispersion which is then added to the previously made mixture of cement, water and alkali. The components are mixed together at room temperature, or slightly above, to cause the formation of gas by the reaction of the metallic powder and the alkali. The components are mixed into a mold and allowed to rise and solidify.

A typical composition may be prepared as follows: One sack of Portland cement containing 94 pounds of cement is mixed with six and one-half gallons of water and 7 ounces of sodium hydroxide. The dispersion of metallic particles is prepared by adding one teaspoonful of a 10% solution of a sulphonated organic substance such as "Sterox" to 300 mesh aluminum powder, and one-half gallon of water is added to make a stable emulsion of aluminum powder and emulsifying agent. The emulsion is then mixed with the previously prepared cement mixture for about two minutes. The thus mixed composition is then promptly poured into block or other molds and allowed to rise. If blocks are being prepared, a covered mold is used.

As previously mentioned, the amount of metallic powder determines the amount of swelling which takes place. For example, in the example given above, the use of one ounce of 300 mesh aluminum powder gives a 90 to 100% rise, while the use of two ounces of powder in the composition gives a rise of approximately 165%.

If desired, an amount of plaster of Paris prepared by the calcination of gypsum may be added to the dry cement for admixture. The plaster of Paris is used to increase the surface tension of the mix which tends to hold the evolved gas within the cement mass. In general, from about two ounces to about sixteen ounces of plaster of Paris may be used per 94 pounds of Portland cement.

Further, if desired, a small amount of sodium silicate (water glass), for example, 1 to 5 ounces per sack of cement, may be added to the composition to further increase the impermeability or non-porosity of the product. In addition, the incorporation of small amounts of sodium silicate increases the compressive strength of the material by as much as 10%.

If desired, certain light-weight filler aggregates such as blast furnace slag, expanded silica, pumice, and vermiculite may be added to the cement composition. In general from about one part cement may be used in conjunction with two to five parts of the aggregates. When such aggregates are used, it is desirable to increase the water content of the mixture to approximately twice that given for the normal cementitious mixture.

The cement composition of the present invention is characterized by a relatively low density, normally about 26 to 35 pounds per cubic foot. The most distinctive property of the composition is the character of the voids which are produced. These voids are isolated and of controlled uniform size throughout the product. This product is free from channels through the body of the material. Thus the cement product is non-porous and resists impregnation by water to any appreciable extent.

I claim as my invention:

1. The method of preparing a cellular hydraulic cement which comprises mixing 94 parts by weight of Portland cement with from 40 to 90 parts by weight of water and with from 0.3 to 0.6 part by weight of sodium hydroxide, and adding to the resulting mixture a dispersion of from 0.06 to 0.19 part by weight of aluminum powder in an aqueous solution of a water soluble organic sulphonate emulsifying agent under conditions to effect a reaction between said aluminum and said sodium hydroxide to produce a pore-forming gas.

2. The method of preparing a cellular hydraulic cement structure, which comprises incorporating an alkali into an aqueous mix of a hydraulic cement, in a separate operation dispersing metallic aluminum particles into an aqueous solution of a water soluble emulsifying agent selected from the group consisting of organic sulphates and sulphonates, and mixing the resulting dispersion with said aqueous cement mix, the amount of alkali and of aluminum being in substantially reactive proportions.

3. In the method of preparing a molded cellular hydraulic cement structure which includes the incorporation of aluminum metal and an alkali metal hydroxide into the aqueous cement mixture to generate a pore-forming gas, the improvement which comprises dispersing metallic aluminum particles into an aqueous solution of a water soluble emulsifying agent selected from the group consisting of organic sulphates and sulphonates to form a stable dispersion, and incorporating such dispersion in a premixed aqueous cement mixture containing an alkali metal hydroxide in an amount sufficient to react with said aluminum to generate a pore-forming gas but insufficient to effect said cement deleteriously.

4. The method of preparing a molded cellular hydraulic cement structure having independent, non-connected voids, which comprises incorporating an alkali metal hydroxide into an aqueous mix of a hydraulic cement, in a separate operation dispersing finely divided metallic aluminum particles into an aqueous solution of a water soluble emulsifying agent selected from the group consisting of organic sulphates and sulphonates, mixing the resulting dispersion with said aqueous hydraulic cement mix, the proportions of the alkali metal hydroxide and aluminum being within those equivalent to from 0.3 to 0.6 part by weight of alkali metal hydroxide to from 0.06 to 0.19 part by weight of aluminum, and molding the resulting mixture.

BENJAMIN M. KING, JR.

REFERENCES CITED

The following references are of record in the file of this patent:

UNITED STATES PATENTS

| Number | Name | Date |
|---|---|---|
| 1,863,990 | Nelson | June 21, 1932 |
| 2,240,622 | Lawson | May 6, 1941 |
| 2,282,190 | Jahjah | May 5, 1942 |